(12) United States Patent
Chang et al.

(10) Patent No.: US 7,508,866 B2
(45) Date of Patent: *Mar. 24, 2009

(54) ACQUISITION MATCHED FILTER FOR W-CDMA SYSTEMS PROVIDING FREQUENCY OFFSET ROBUSTNESS

(75) Inventors: Li Fung Chang, Holmdel, NJ (US); Kapil Chawla, Scotch Plains, NJ (US); Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 11/494,660

(22) Filed: Jul. 27, 2006

(65) Prior Publication Data

US 2006/0262837 A1    Nov. 23, 2006

Related U.S. Application Data

(63) Continuation of application No. 09/994,763, filed on Nov. 28, 2001, now Pat. No. 7,106,787.

(51) Int. Cl.
*H04B 1/69* (2006.01)
*H04L 27/06* (2006.01)

(52) U.S. Cl. ...................... 375/152; 375/343
(58) Field of Classification Search ............... 375/142, 375/143, 145, 149, 150, 152, 343, 367; 370/335, 370/342, 516
See application file for complete search history.

(56) References Cited

U.S. PATENT DOCUMENTS

| | | | |
|---|---|---|---|
| 5,428,647 A | 6/1995 | Rasky et al. | |
| 5,739,691 A * | 4/1998 | Hoenninger, III | 324/322 |
| 5,796,787 A | 8/1998 | Chen et al. | |
| 5,950,131 A | 9/1999 | Vilmur | |
| 6,208,683 B1 | 3/2001 | Mizuguchi et al. | |

(Continued)

OTHER PUBLICATIONS

Sophia Antipolis, 3rd Generation Partnership Project; Tehcnical Specification Gruop Radio Access Network; Physical layer—General description, Released 1999, 14 pages, Valbonne, France.

(Continued)

*Primary Examiner*—Young T. Tse
(74) *Attorney, Agent, or Firm*—Garlick Harrison & Markison

(57) ABSTRACT

A system and method for acquiring a transmitted spread-spectrum signal uses a matched filter configuration that is preferably employed as a Stage 2 filter in the second phase of an initial signal acquisition procedure performed in the receiver. In operation, a Stage 1 filter matches a sequence which is repeated a number of times according to a second sequence within a secondary synchronization sub-channel of the spread-spectrum signal. The Stage 2 filter of the invention then filters the output of the Stage 1 filter in order to recover a secondary synchronization code. The Stage 2 filters the output of the Stage 1 filter using three matched filters of its own. The first and second filters sample different taps of a sequence output from the Stage 1 filter. The third filter samples a predetermined number of taps overlapping taps for the first and second filters in a way that resolves ambiguities with respect to the identification of the sequence. The ambiguity resolution performed by the third filter improves the frequency offset robustness and thus the overall performance of the receiver.

12 Claims, 8 Drawing Sheets

U.S. PATENT DOCUMENTS

| | | | |
|---|---|---|---|
| 6,266,361 B1 | 7/2001 | Huang et al. | |
| 6,269,088 B1 | 7/2001 | Masui et al. | |
| 6,404,832 B2 * | 6/2002 | Abe | 375/350 |
| 6,665,277 B1 | 12/2003 | Sriram | |
| 6,801,567 B1 | 10/2004 | Schmidl et al. | |
| 6,831,929 B1 | 12/2004 | Sriram et al. | |
| 6,920,123 B1 | 7/2005 | Shin et al. | |
| 2002/0027898 A1 | 3/2002 | Tanno et al. | |
| 2002/0057664 A1 | 5/2002 | Sarkar | |
| 2002/0064211 A1 | 5/2002 | Chen et al. | |
| 2003/0055572 A1 * | 3/2003 | Kuki et al. | 702/26 |
| 2003/0095516 A1 | 5/2003 | Ok et al. | |

OTHER PUBLICATIONS

Sophia Antipolis, 3rd Generation Partnership Project; Technical Specification Group Radio Access Network; Physical channels and mapping of transport channels onto physical channels (FDD), Released 1999, 45 pages, Valbonne, France.

Sophia Antipolis, 3rd Generation Partnership Product; Technical Specification Group Radio Access Network; Spreading and modulation (FDD), Released 1999, 26 pages, Valbonne, France.

Spread Spectrum Communications, 4pages.

Randy Roberts, The ABCs of Spread Spectrum—A Tutorial, 9 pages.

Jack P.F. Glas, On the Multiple Access Interference in a DS/FFH Spread Spectrum Communication System, last modified on Aug. 29, 1996 by Jack Glas, 9 pages, The Netherlands.

Introduction to CDMA, 15 pages.

* cited by examiner

FIG. 6

ACQUISITION MATCHED FILTER FOR W-CDMA SYSTEMS PROVIDING FREQUENCY OFFSET ROBUSTNESS

CROSS REFERENCE TO RELATED APPLICATION

This application is a continuation of and claims priority to U.S. patent application entitled ACQUISITION MATCHED FILTER FOR W-CDMA SYSTEMS PROVIDING FREQUENCY OFFSET ROBUSTNESS, having an application Ser. No. 09/994,763; filed Nov. 28, 2001; now U.S. Pat. No. 7,106,787; which application is hereby incorporated by reference in this application.

FIELD OF THE INVENTION

This invention generally relates to communications systems which use spread-spectrum technology to transmit and receive digital signals, and more particularly to a system and method for acquiring, for example, direct-sequence spread-spectrum signals in a way that optimizes frequency offset robustness.

BACKGROUND OF THE INVENTION

Code division multiple access (CDMA) is a form of spread-spectrum technology that was initially used by the military to perform anti-jamming, anti-intercept, and other communications applications. Over the last several years, this technology has been the focus of extensive research, mainly because of its suitability to personal wireless mobile communications. CDMA based systems, for example, provide significantly higher bandwidth efficiency for a given spectrum allocation compared with conventional systems. They also demonstrate more favorable power consumption and control properties. This, in turn, ensures that a high-level of transmission quality can be sustained over longer periods of time. CDMA systems are also free from geographical constraints, i.e., many conventional systems must use different frequency allocations based on, for example, cell location. Because a coding scheme is used across a broad spectral range, CDMA systems are free from these restrictions.

Operationally speaking, unlike their conventional predecessors CDMA systems communicate signals over a broad frequency spectrum. Prior to transmission the signal is encoded with a set of digitally generated pseudo-noise (PN) codes. This causes the signal to be effectively scrambled across the spectrum in a virtually undetectable manner. At the receiver side, the signal is recovered through a suitable demodulation and despreading scheme that is based on the same set of PN codes. By using these codes, the receiver is able to eliminate noise in a way that allows the voice and/or data content of the signal to be recovered.

The latest advances in spread-spectrum communications are being made by the so-called $3^{rd}$ Generation Partnership Project (3GPP). This initiative is made up of a consortium of companies from around the world which have gathered to develop a standard protocol for wireless code division multiple access (W-CDMA) communications.

In order for a W-CDMA receiver to receive a spread-spectrum signal, it must first synchronize the timing of the signal with the transmitting station. In accordance with the 3GPP standard, initial signal acquisition of the receiver is established through a synchronization channel (SCH), used for cell search and timing acquisition, and a common pilot channel (CPICH), used for determining a scrambling code of the transmitting station and a phase reference of the signal. The SCH consists of two sub-channels, a primary synchronization-channel (P-SCH) and a secondary synchronization-channel (S-SCH). The primary sub-channel typically transmits a 256-chip modulated code to establish a primary synchronization code (PSC). The secondary synchronization-channel transmits a 256-chip modulated code to establish a secondary synchronization code (SSC).

In order to retrieve information from the transmitted signal, the receiving terminal must first detect the primary synchronization code, so that the timing of the receiving terminal may be synchronized to the 667 microsecond burst timing of the transmitter. Once burst timing synchronization is complete, the receiver detects the secondary synchronization code. This code determines one of 64 PN-code groups to which the scrambling code belongs which is used to modulate the transmitted signal, and it also determines 10 msec. frame timing for the W-CDMA signal. After the code-group is determined from the secondary synchronization channel, the final scrambling code out of 8 per PN-code group is determined by correlating the signal with all 8 possible scrambling codes belonging to the code group. This code may also be used to demodulate a downlink signal transmitted on the common pilot channel to thereby identify the transmitting station.

One key problem associated with the initial acquisition of a W-CDMA signal relates to the frequency accuracy of the receiving terminal. A typical frequency reference for a cellular handset has an accuracy between 2 and 5 parts per million (PPM). This results in a carrier frequency error at 1900 MHz operating frequencies of up to about 10 KHz. This accuracy is readily obtained in very small crystal oscillators costing several dollars and is suitable for use in cellular handsets. Base stations, on the other hand, require much greater accuracy typically on the order of 0.05 PPM or only about 100 Hz of error at 1900 MHz. Using equipment that can attain this accuracy has significantly increased the cost of W-CDMA systems. It is therefore desirable to relax the frequency accuracy requirement for initial acquisition in order to lower the cost of the receiving terminal and improve robustness.

Various methods have been developed for improving accuracy in a spread-spectrum system. U.S. Pat. No. 5,950,131 to Vilmur, for example, discloses a method for performing fast-pilot channel acquisition using a matched filter in a CDMA radiotelephone. According to this method, a matched filter is split into multiple matched filters in a linear arrangement with short chip-match lengths. This improves frequency robustness for mapping the PN demodulation code to the modulated signal. The Vilmur approach, however, has proven to have significant drawbacks. For example, this approach is unable to distinguish between codeword ambiguities, depending upon codeword design of a specific system. The inability to resolve these ambiguities substantially affects the performance of the matched filter and therefore the overall system. (The Vilmur method is discussed in greater detail below, and specifically corresponds to a conventional system which is unable to distinguish between sequences 0 and 8 shown in FIG. 6 during initial signal acquisition.)

In view of the foregoing considerations, it is clear that there is a need for an improved method for performing initial signal acquisition in a spread-spectrum communications system, and more particularly one which minimizes receiver errors attributable to frequency offset.

SUMMARY OF THE INVENTION

The present invention is a system and method for acquiring a transmitted spread-spectrum signal. The system includes a matched filter configuration which is preferably employed as a Stage 2 filter in a two-stage matched filter which is used for the second phase of an initial signal acquisition method performed by the spread-spectrum receiver. In operation, a Stage 1 filter matches a sequence which is repeated a number of times according to a second sequence, where the overall sequence forms the secondary synchronization sub-channel of the spread-spectrum signal. The Stage 2 filter of the invention then filters the output of the Stage 1 filter in order to recover the timing and presence of the secondary synchronization code that is used to determine the codegroup out, for example, of 64 possibilities and a 10 msec. frame timing of the signal.

In accordance with one embodiment, the Stage 2 filter of the invention includes a first matched filter which filters a first set of taps of the sequence output from the Stage 1 filter, a second matched filter which filters a second set of taps of this sequence, and a third matched filter which filters a predetermined number of taps overlap taps which are used by the first and second matched filters. The output of the third filter is used to resolve any ambiguities as to the identity of the sequence, which ambiguities would likely occur if a conventional Stage 2 filter design were used. The number of taps handled by the third filter may vary. For example, according to one aspect of the invention the third filter samples the same number of taps from the first and second matched filters. A different number, however, may be sampled if desired provided that accurate recognition of the sequence output from the Stage 1 filter is preserved. The identification of the sequence leads to a substantial reduction in frequency offset errors in the receiver and thus an accurate determination of a secondary sequence code embedded in the spread-spectrum signal.

BRIEF DESCRIPTION OF THE DRAWINGS

FIG. 6 is a chart which includes a Hadamard matrix of modulated signal elements that may be searched by a second phase, Stage 2 filter configured in accordance with the present invention.

DETAILED DESCRIPTION OF THE INVENTION

Figure 1:
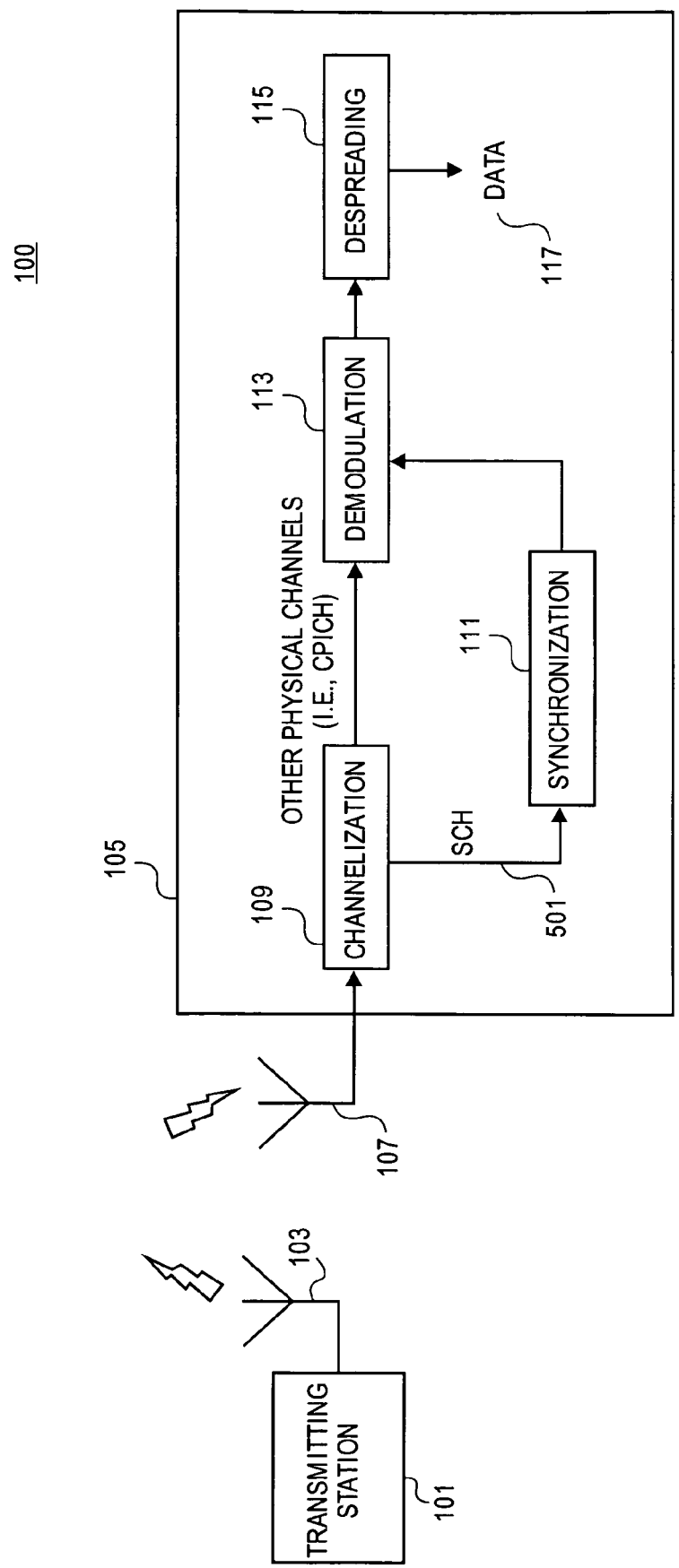
FIG. 1 is a diagram of a W-CDMA system in which the present invention may be employed. This system is discussed for illustrative purposes only and therefore should in no way be held to be limiting of the invention, as those skilled in the art can appreciate that the invention may be implemented in various other spread-spectrum configurations.

Referring to FIG. 1, a W-CDMA system 100 includes a transmitting station 101 and a receiving terminal 105, the latter of which includes a channelization circuit 109, a synchronization circuit 111, a demodulation circuit 113, and a despreading circuit 115. In operation, the transmitting station transmits a W-CDMA signal through a transmission antenna 103. This signal is received by an antenna 107 of the receiving terminal. Once received, the channelization circuit separates a synchronization channel (SCH) from other physical channels such as the common pilot channel (CPICH).

During initial signal acquisition, the synchronization channel component of the received signal is filtered to recover information that may be used to synchronize the timing of the receiving terminal with the transmitting station. This filtering operation takes place in synchronization circuit 111, the output of which results in the identification of a PN code which may be used to demodulate, in demodulator circuit 113, the other physical channels including the common pilot channel. The despreading circuit 115 then de-spreads the demodulated signal to recover the content 117 (e.g., voice and/or data) of the signal transmission.

The system and method of the present invention may be used to perform initial signal acquisition in a W-CDMA system such as described above. The invention, however, is not intended to be limited to such a system. Those skilled in the art can appreciate that the initial signal acquisition performed in accordance with the present invention may be implemented in virtually any type of communications system which operates using spread-spectrum technology. Systems such as these include any one of a variety of military systems, a wireless LAN system, or various types of CDMA cellular systems. For illustrative purposes, the following discussion is provided with respect to a system which conforms to a third-generation W-CDMA standard.

Figure 2:
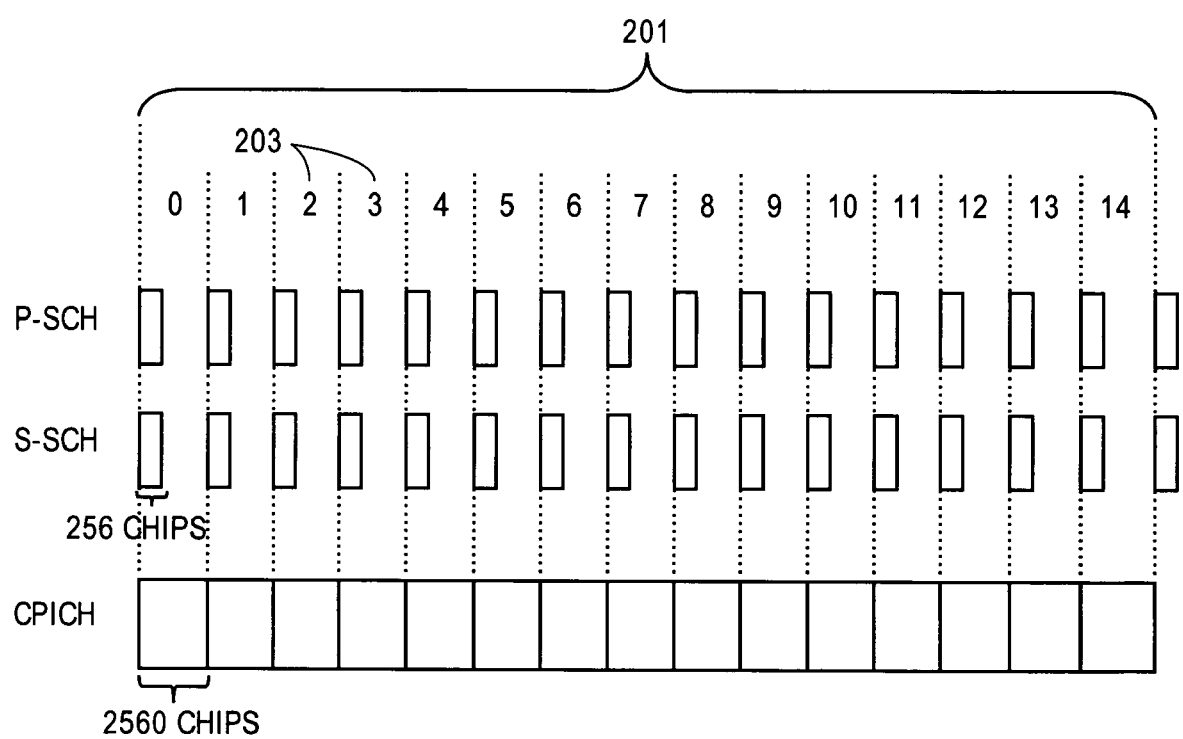
FIG. 2 is a diagram of a radio frame structure that includes a primary sub-channel, a secondary sub-channel, and a common pilot channel transmitted in the system shown in FIG. 1.

A W-CDMA system in accordance with this standard operates at a chip rate of 3.84 Mchips/sec within a 10 msec radio frame. As shown in FIG. 2, each 10 msec radio frame 201 is divided into fifteen time slots 203 numbered "0" through "14." The primary sub-channel (P SCH) and the secondary sub-channel (S-SCH) are transmitted simultaneously during the first 256-chips of each 2,560-chip time slot, and the transmitting station continuously transmits the common pilot channel throughout all 15 time slots in the radio frame.

Initial signal acquisition may be accomplished in three phases. The first phase targets the acquisition of the primary synchronization code from the received signal. The second phase targets acquisition of the secondary synchronization code from the received signal. And, the third phase targets the determination of a specific spreading code used by a base station out of, for example, eight possible codes within a codegroup that was identified in the second phase.

Figure 3:
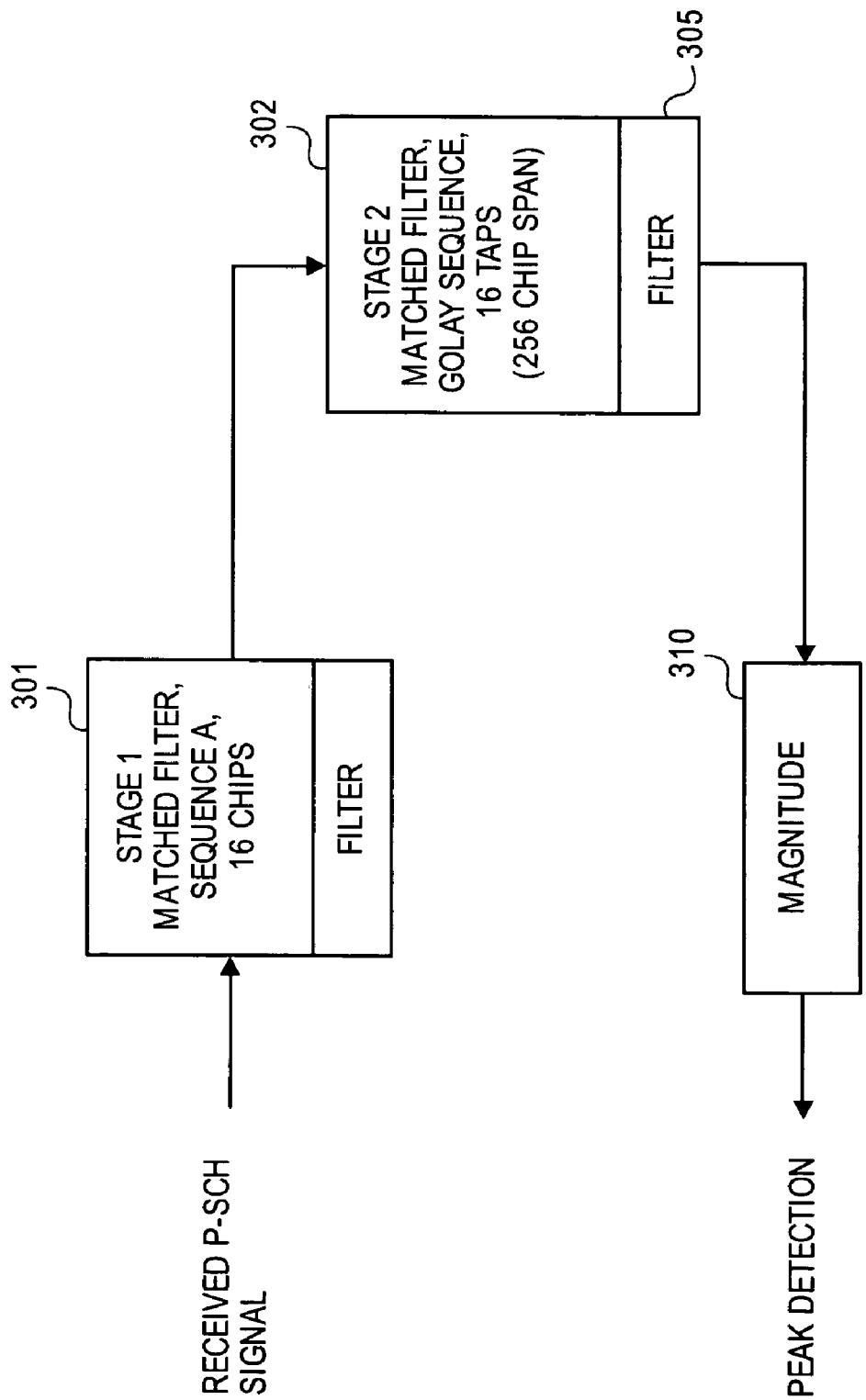
FIG. 3 is a diagram of a filter configuration that may be used in a first phase of an initial signal acquisition process.

FIG. 3 shows one type of filter configuration for performing the first-phase of initial signal acquisition. This circuit includes two matched filters connected in tandem, namely a Stage 1 filter 301 and a Stage 2 filter 302. In operation, the Stage 1 filter searches for a predetermined sequence a in a primary synchronization sub-channel (P-SCH) signal. Sequence a may be represented, for example, by a sixteen element sequence given by:

$$a = <x1, x2, x3, \ldots, x16> = <1,1,1,1,1,1,-1,-1,1,-1,1,-1, 1,-1,-1,1>$$

The sixteen element sequence is multiplied by ±1 and repeated sixteen times in the 256-chip span over all 256-chips of the primary synchronization channel in each of the fifteen time slots.

In the Stage 2 filter, each instance of sequence a is modulated by a Golay complementary sequence. The result is a 16-chip complex-value sequence defined as:

$$C_{psc}=(1+j)\times <a,a,a,-a,-a,a,-a,-a,a\ a,a,a,-a,a,-a,a,a>$$

where the leftmost chip in the sequence corresponds to the chip transmitted first in time. A single 16-tap filter 305 included within the Stage 2 filter then analyzes the signal for the Golay sequence. Thus, the first phase of initial signal acquisition may comprise a 16+6 hierarchical filter design. The magnitude of the signal output from the Stage 2 filter is determined by a magnitude determination circuit 310 and the results is subjected to peak detection to extract the primary synchronization code embedded in the received signal.

Figure 4:
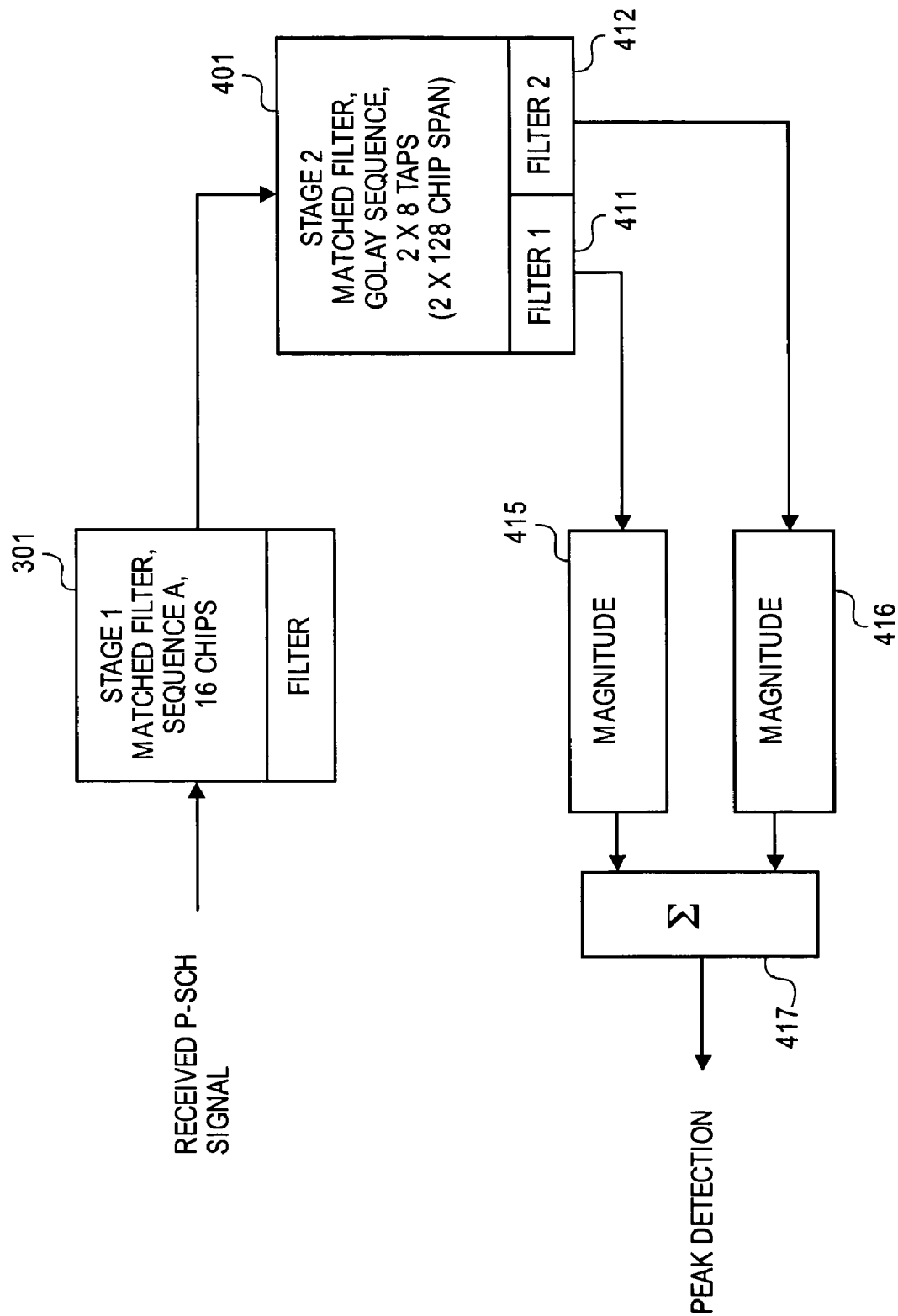
FIG. 4 is a diagram of another filter configuration that may be used in the first phase of an initial signal acquisition process.

FIG. 4 shows another filter configuration for performing the first phase of initial signal acquisition. The circuit also includes two matched filters connected in tandem, however the Stage 2 filter and its corresponding magnitude circuits are different. Unlike FIG. 3, in the Stage 2 filter 401 of FIG. 4 the single 16-tap matched filter 305 is replaced with two 8-tap filters 411 and 412. The 16-element sequence $C_{psc}$ mentioned above is then divided into two sections of 8 taps each, so that the overall composite response is equivalent to two 128-chip matched filters. More specifically, filter 411 analyzes the first 8 taps of the 16-tap Golay modulated signal and filter 412 analyzes the last 8 taps of this signal. The resulting magnitudes of these signals are then respectively determined in circuits 415 and 416 and then non-coherently added in a summation circuit 417. The output of the summation circuit is then subjected to peak detection to recover the primary synchronization channel embedded in the received signal. Replacing a single 16-tap matched filter in Stage 2 with two 8-tap filters is beneficial because it prevents phase roll from occurring over long filter time spans. The replacement also improves frequency offset robustness, which, in turn, translates into improved accuracy in terms of signal reception.

Figure 5:
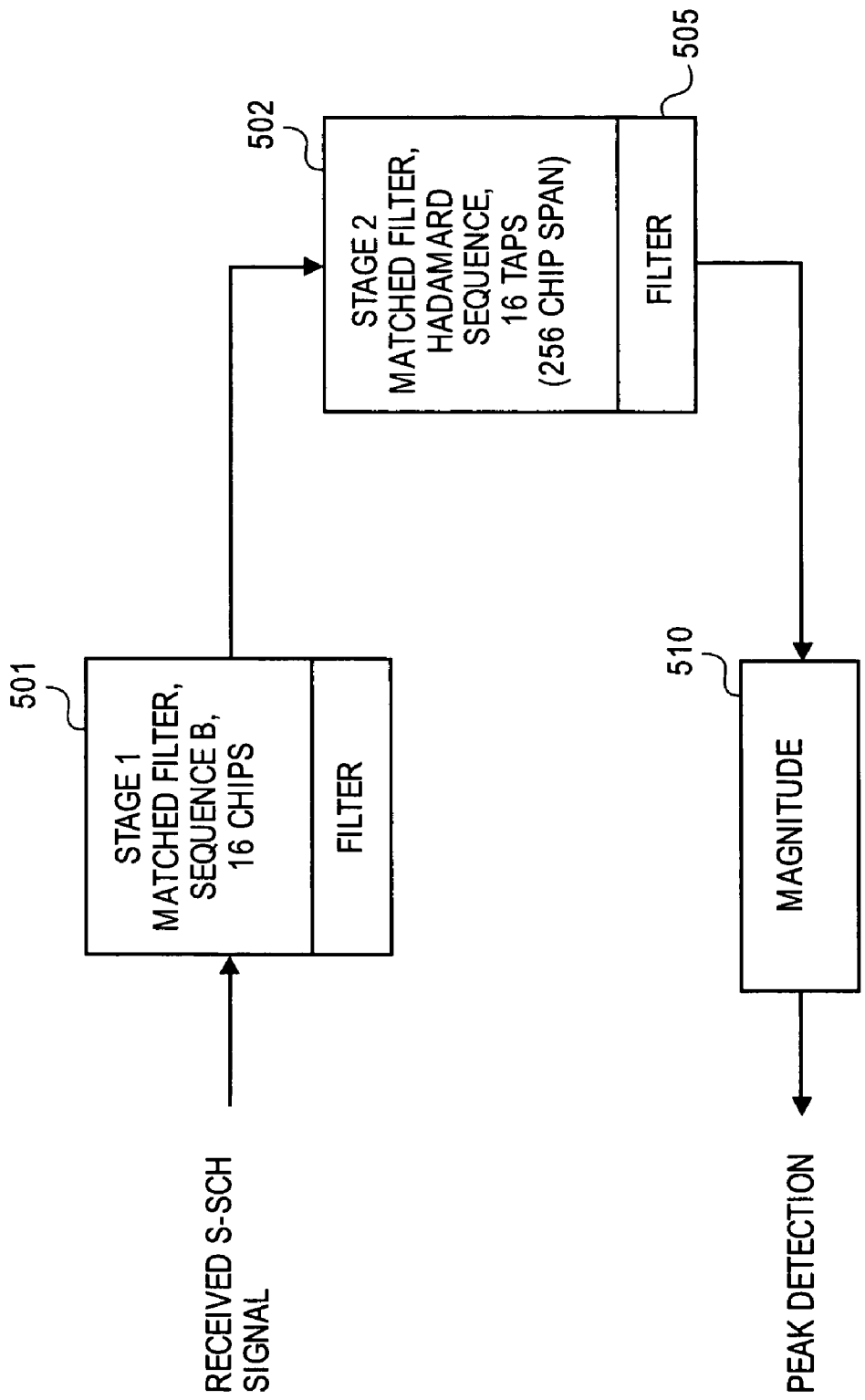
FIG. 5 is a diagram of a filter configuration that may be used in a second phase of an initial signal acquisition process.

FIG. 5 shows a filter configuration for performing the second phase of initial signal acquisition. As previously stated, an objective of this second phase is to recover the secondary synchronization code from the received signal. Recovery of this code is accomplished using two stages of matched filters, which may also be characterized as Stage 1 filter 501 and Stage 2 filters 502, and a magnitude determination circuit 510. The Stage 1 filter 501 searches for sequence b in the received secondary synchronization sub-channel, which sequence may be represented as:

$$b=<x1, x2, x3, x4, x5, x6, x7, x8, -x9, -x10, -x11, -x12, -x13, -x14, -x15, -x16>$$

where x1, x2, . . . , x15, x16 are same as in the definition of sequence a above. Sequence b similarly spans 16-chips and likewise is multiplied by a ±1 and repeated sixteen times over the 256-chip span of each time slot.

The Stage 2 filter 502 searches for a sequence z in the output of the Stage 1 filter. This sequence may he represented by:

$$z=<b, b, b, -b, b, b, -b, -b, b, -b, b, -b, -b, -b, -b, -b>$$

At the time of transmission, sequence z is modulated by position-wise multiplication of a Hadamard sequence which is obtained in accordance with the following definition:

$$H_0 = (1)$$

$$H_k = \begin{matrix} H_{k-1} & H_{k-1} \\ H_{k-1} & -H_{k-1} \end{matrix}, \text{ where } k \geq 1$$

In the above equation, the n:th Hadamard sequence may be denoted as a row $H_8$ numbered from the top, n=0,1, 2, . . . , 255, in the sequel and k=1, 2, 3, . . . , 16. Moreover, $h_n(i)$ and z(i) denote the i:th symbol of the sequence $h_n$, and z, respectively, where i=0, 1, 2, . . . , 255 and i=0 corresponds to the leftmost symbol.

Figure 6:
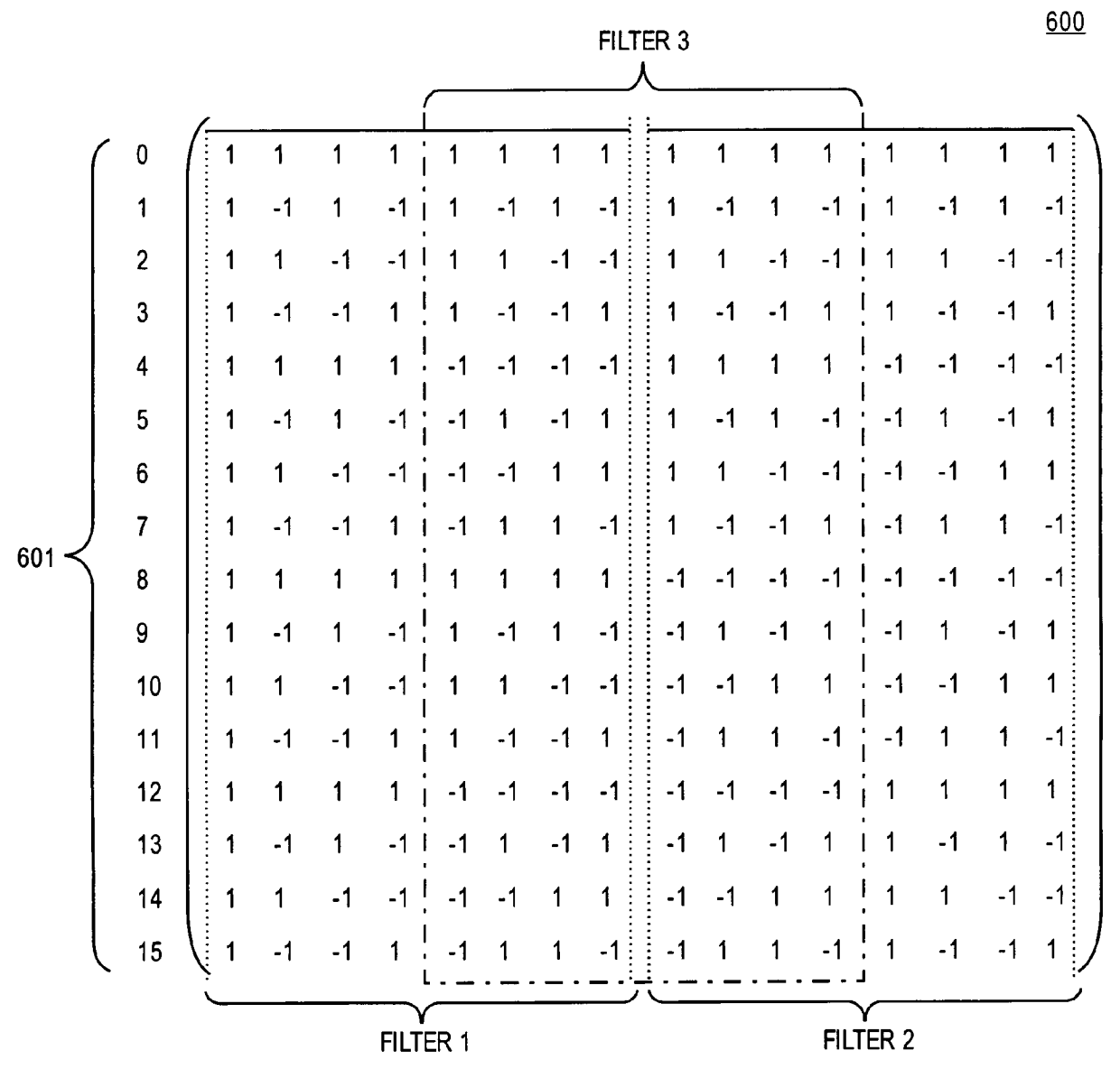

The Stage 2 filter 502 uses a single 16-tap filter 505 to search the output from the Stage 1 filter for one of sixteen orthogonal sequences of the Hadamard matrix 600 shown in FIG. 6, as was similarly done for the Golay sequences in the first phase of signal transmission.

The Stage 2 filter shown in FIG. 5 is disadvantageous in at least one respect. In the previous discussion of the first phase of initial signal acquisition, it was indicated that replacing a single 16-tap Stage 2 matched filter with two 8-tap matched filters improved frequency offset robustness and that from at least this standpoint the replacement was highly desirable. Taking a similar approach for the Stage 2 filter in the second phase, however, would result in a catastrophic ambiguity that would degrade the performance of the receiver. This may be understood as follows.

In FIG. 6, sequences 0 and 8 may be separated into two 8-chip sequences to be used for non-coherent combining of detected signals. These sequences are reproduced below for the sake of clarity:

| Sequence 0 | 1 | 1 | 1 | 1 | 1 | 1 | 1 | 1 | 1 | 1 | 1 | 1 | 1 | 1 | 1 | 1 |
| Sequence 8 | 1 | 1 | 1 | 1 | 1 | 1 | 1 | 1 | -1 | -1 | -1 | -1 | -1 | -1 | -1 | -1 |

From the above, it is evident that sequences 0 and 8 are identical with respect to the first 8 chips and differ only in terms of sign with respect to the second 8-chips. If the signs of the second 8 chips are ignored, sequences 0 and 8 are indistinguishable (this is the effect caused by splitting the stage 2 filter into two sections and taking the magnitude or absolute value of their outputs before summing). This ambiguity means that some code group patterns in the secondary synchronization sub-channel (S-SCH) will be indistinguishable from other code group S-SCH patterns. Consequently, while splitting the Stage 2 filter in the manner shown in FIG. 4 may be beneficial in the first phase of initial signal acquisition, splitting the single 16-tap filter 505 into two 8-tap filters in Stage 2 of the second phase will corrupt the performance of the receiver in terms of its ability to distinguish between sequences 0 and 8, at least with respect to systems which conform to 3GPP specifications.

Figure 7:
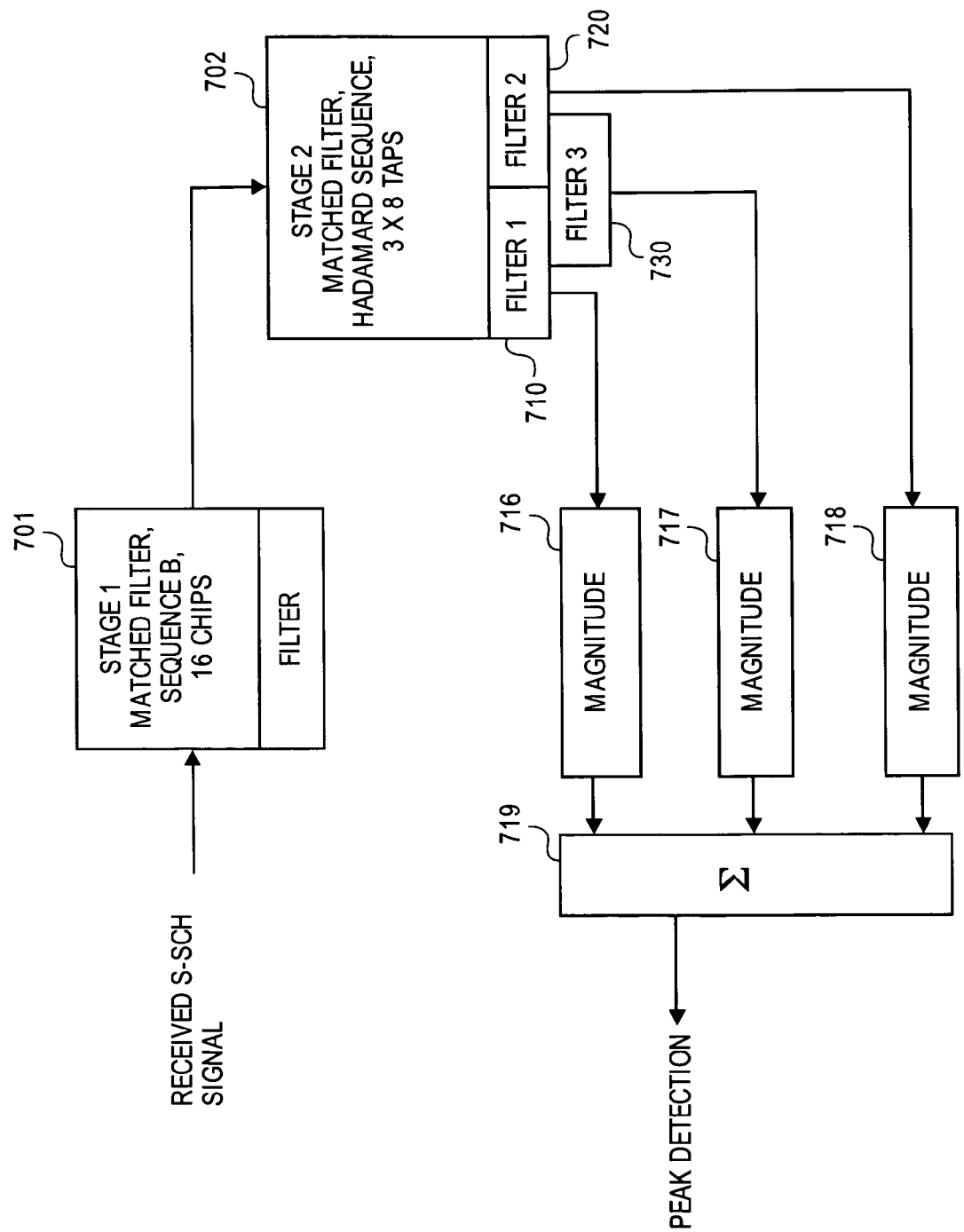
FIG. 7 is a diagram of a preferred embodiment of second phase, Stage 2 filter configured in accordance with the present invention.

The present invention is a system and method which solves the ambiguity problem outlined above in a way that simultaneously improves frequency offset robustness of the receiver. Referring to FIG. 7, a preferred embodiment of the system includes a Stage 1 matched filter 701, a Stage 2 matched filter 702, a plurality of magnitude determination circuits 716, 717, and 718, and a summation circuit 719. The Stage 1 filter may be structurally and functionally similar to filter 501 in FIG. 5.

The Stage 2 filter is modified in accordance with the present invention to include three filters 710, 720, and 730.

The first two filters 710 and 720 may be similar to filters 411 and 412 shown in FIG. 4, i.e., filter 710 is an 8-tap filter which samples the first 8-chips of the sequences output from the Stage 1 filter and filter 720 is an 8-tap filter which samples the last 8-chips of these sequences. (The sequences may be any of those shown in FIG. 6). The third filter 730 is a matched filter with input taps that overlap the taps of filters 710 and 720. More specifically, filter 730 is an 8-tap filter which processes a number of taps from filter 710 and a number of taps from filter 720. The numbers of taps processed are preferably selected to allow the third filter to differentiate between any ambiguous sequences that were not identified by the first two filters. This may be accomplished in a variety of ways in accordance with the present invention.

As previously explained, if a Stage 2 filter in the second phase of initial signal acquisition is only comprised of filters 710 and 720, a catastrophic ambiguity will likely arise that will prevent the receiver from differentiating, for example, between sequences 0 and 8 shown in FIG. 6. (It is noted that ambiguities of this type may also arise for sequence pairs 1 and 9, 2 and 10, 3 and 11, 4 and 12, 5 and 13, 6 and 14, and 7 and 15 because in each of these pairs the first 8 taps are identical and the last 8 taps differ only in respect to their sign). In order to overcome these ambiguities, the third filter processes a predetermined number of taps from the first filter 710 and a predetermined number of taps from the second filter 720 in a way that distinguishes between the sign differences that exist in the last 8 taps of the above-noted sequence pairs.

In accordance with one embodiment of the invention, the third filter processes the last four taps of filter 710 and the first four taps of filter 711. (See FIG. 6 where these taps are denoted by the bracket labeled "filter 3.") Under these circumstances, the first four taps from filter 710 will be identical when compared, however the sign difference in the last four taps will be recognized by the third filter. By recognizing this difference, the third filter will distinguish between sequences whose first 8 taps are identical, e.g., sequences 0 and 8 in FIG. 6. As a result, ambiguities that would have arisen from using filters 710 and 720 alone are prevented. This will result in an increase in frequency offset robustness and thus the overall performance of the receiver.

More specifically, sampling the last 4 taps from the first filter 710 and the first four taps from the second filter 720 is preferable because it keeps phase roll to a minimum. As those skilled in the art can appreciate, phase roll degrades system performance with frequency offset errors. Because phase rolls grows with spacing, producing a close spacing of taps will tend to minimize phase roll. The third filter of the invention achieves this close spacing and thus advantageously keeps system performance at a high level.

In accordance with alternative embodiments of the invention, the third filter may sample a different number of taps from the first two filters. The number may be any number that will allow sequences which are similar but not identical from being differentiated. For example, the third filter may sample three or two taps or even one tap and still be able to solve the ambiguity problem, however sampling fewer taps will tend to degrade performance because of an increased sensitivity to noise.

According to another approach, the third filter of the invention may sample the first four taps from the first filter 710 and the last four tapes from the second filter 720. Sampling in this manner will also accomplish ambiguity resolution. According to still another approach, the third filter of the invention may sample non-sequential patterns of taps. For example, every other tap may be sampled, with 2 taps on each side of the center for the third filter. In this latter case, ambiguity resolution is achieved but likely with degraded performance compared with the optimal case described above.

After ambiguity resolution is performed, the output from each of the three filters 710, 720, and 730 is fed into respective magnitude determination circuits 716, 717, and 718. The magnitude determination circuits allow the parts of the various filters in stage 2 to be non-coherently combined. This results in a positive real number given a complex number input. In mathematical terms, it involves, for example, translating the filter output from cartesian (x,y) coordinates to polar coordinates (r, θ) and discarding the θ component, i.e, the results do not depend on the phases of the output of each filter. This makes the results obtained by the invention robust to frequency offsets, which cause phase difference among the different filter results and hence the possibility of desired signal cancellation.

As previously stated, the outputs from the magnitude determination circuits are summed (non-coherently combined) in the summation circuit 719. The resulting sequence from circuit 719 spans the 15 time slots illustratively shown in FIG. 2 and identifies a code group which may be mapped to the secondary synchronization code (SSC) in accordance with the following definition:

For the k:th SSC, where k=1, 2, 3, ..., 16, $C_{ssc,k}$, is defined as $$C_{ssc,k}=(1+j)\times<h_m(0)\times z(0), h_m(1)\times z(1), h_m(2)\times z(2), \ldots, h_m(255)\times z(255)>;$$

where $m=16\times(k-1)$ and the leftmost chip in the sequence corresponds to the chip transmitted first in time. Under 3GPP specifications, $C_{SSC}$ may identify the PN demodulation code for the common pilot channel used for demodulator circuit 113 and the transmitting station 101 may be identified. Frequency offset can now be corrected based on the local reference of the identified transmitting station 101. The robustness of this frequency offset will be improved compared with conventional systems through the Stage 2 matched filter of the present invention which is employed in the second phase of initial signal acquisition. The following comparison makes this improvement evident.

Figure 8:
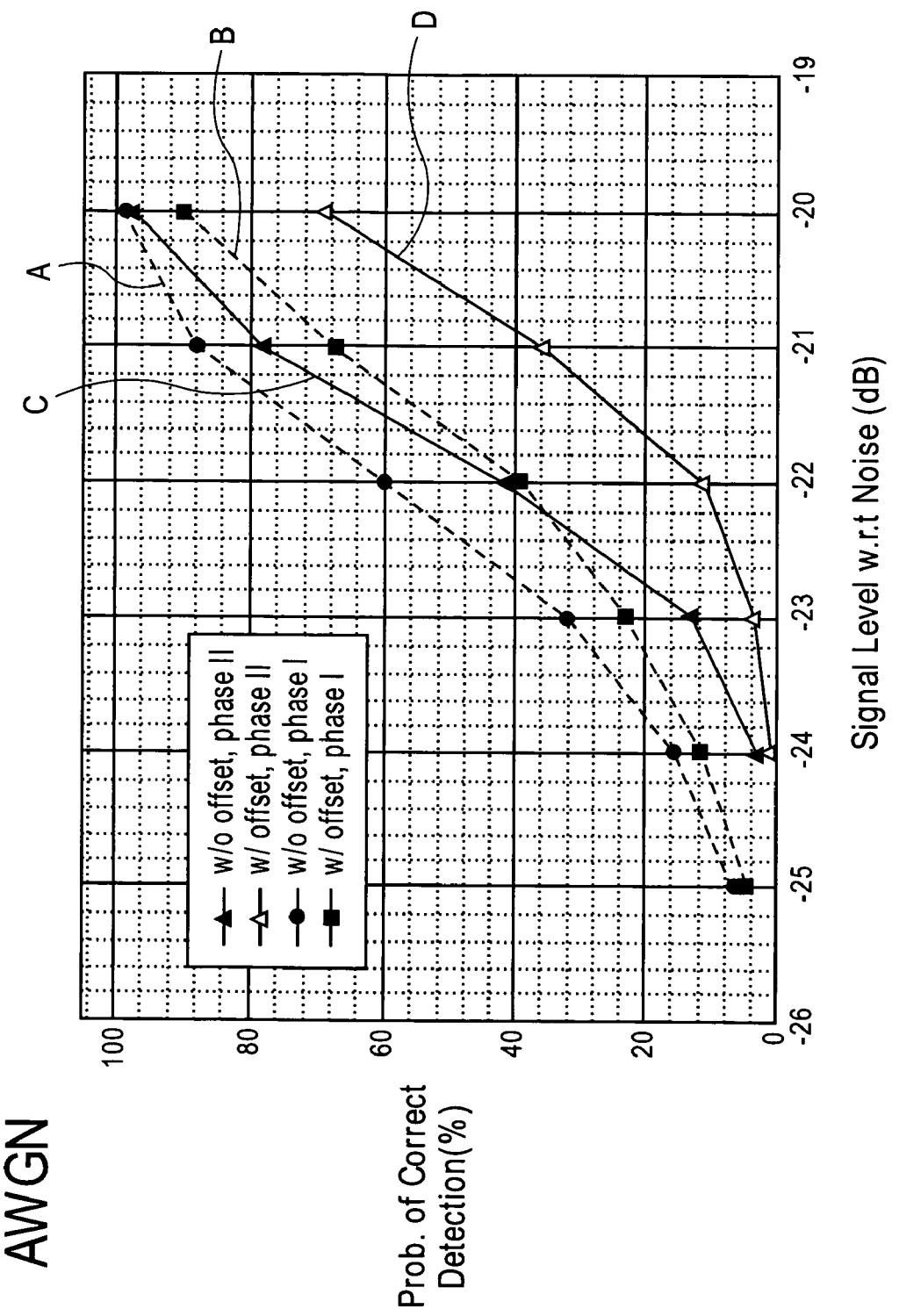
FIG. 8 is a graph illustrating an improvement in the reception accuracy achieved in accordance with the present invention.

FIG. 8 is a graph which compares exemplary levels of performance attainable by the present invention in four situations. In this graph, the probability of correct detection in terms of percentages (vertical axis) is plotted against the signal level with respect to noise (horizontal axis) measured in terms of dB. Performance is then measured against noise or interference levels varying from 26 to 19 dB stronger than the S-SCH signal. The performance is shown for no frequency offset at the terminal and for 10 kHz frequency offset at the terminal, which may happen for a 5 parts-per-million assumed crystal and 1900 MHz operation.

Curve A corresponds to performance attained without frequency offset for phase 1 only. Curve B corresponds to performance attained with frequency offset for phase 1 only. Curve C shows performance attained without offset when both phase 1 and phase 2 are implemented. And, Curve D shows performance attained with offset when both phase 1 and phase 2 are implemented. The curves show that 10 kHz frequency offset only degrades performance about 1 dB for the phase 2 results (this means executing sequentially phase 1 and then phase 2). In comparing the invention to conventional filters, it is seen that at about 15 kHz, the conventional filter will achieve a null for a desired signal and hence will not detect it, and at 10 kHz it is highly degraded. The present invention moves the null out to 30 kHz (e.g., 1/33 microseconds, which is equal to the length of the Stage 2 filters in time), which results in a very small degradation at 10 kHz frequency offset.

More specifically, a frequency offset of 10 kHz shows only about 1 dB of degradation compared to no frequency offset. It is also seen that the second phase impairs performance only about 1 dB beyond the first phase, proving that catastrophic ambiguity is resolved and the matched filter of the present invention provides high performance for phase II acquisition for W-CDMA with robustness to frequency offset errors up to 10 kHz or 5 PPM for 2 GHz operating frequencies.

With a 5 parts-per-million (PPM) frequency error for the reference of the receiving terminal (typical for 2nd Generation wireless terminals), up to a 10 KHz offset will result during initial signal acquisition with a 2 GHz operating frequency. As a result, a phase roll of 360 degrees in 100 usec will occur with a high likelihood of data corruption. In a conventional system, which uses the phase I filter configuration shown in FIG. 3 coupled to the phase II filter configuration shown in FIG. 5, each of the matched filters therein span 256-chips and, at the standard chip rate of 3.84 Mchips/sec, correspondingly span 67 usec. Under these circumstances, if there is a 10 KHz frequency offset the output will be degraded by 5 dB relative to no frequency offset. This degradation is generally unacceptable for W-CDMA systems, particularly a 3GPP system.

When the first-phase Stage 2 matched filter configuration shown in FIG. 4 is used to replace the configuration of FIG. 3, an improvement is realized. In this configuration, each of the split filters 411 and 412 spans 128-chips and correspondingly 33.3 usec. Using this combined phase I and phase II configuration, the receiver achieves only 1.5 dB of degradation at 10 KHz frequency offset. Through the present invention, an even better result is achieved.

A receiver configured in accordance with the present invention preferably includes a phase I filter configuration as shown in FIG. 4 and a phase II filter configuration as shown in FIG. 7. In this combined architecture, by limiting all Stage 2 filters to only 33.3 usec, a robust frequency offset of up to 10 KHz is preserved.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A method comprising:
    filtering a first set of taps corresponding to a sequence associated with a synchronization channel of a spread-spectrum signal;
    filtering a second set of taps corresponding to the sequence;
    filtering a third set of taps from at least a portion of the first set of taps and at least a portion of the second set of taps;
    determining a magnitude of an output from the first set of taps;
    determining a magnitude of an output from the second set of taps;
    determining a magnitude of an output from the third set of taps;
    adding the magnitudes of the outputs from the first, second and third sets of taps using a summation circut; and
    determining the sequence based on the magnitudes of the outputs from the first, second and third sets of taps.

2. The method of claim 1, wherein determining the sequence based on the magnitudes includes:
    performing peak detection on the added magnitudes; and
    acquiring a synchronization code for the spread-spectrum signal based on the peak detection.

3. The method of claim 2, wherein the first set of taps and the second set of taps have a same number of taps.

4. The method of claim 2, wherein the output from the first set of taps corresponds to a first half of the sequence and the output from the second set of taps corresponds to a second half of the sequence, wherein the output from the third set of taps determines sign difference between the outputs from the first and second set of taps when the magnitudes from the first and second set of taps are equal.

5. The method of claim 4, wherein the sequence is a Hadamard sequence.

6. The method of claim 4, wherein the spread-spectrum signal is a CDMA signal.

7. An apparatus comprising:
    a first filter to filter a first set of taps corresponding to a sequence associated with a synchronization channel of a spread-spectrum signal;
    a second filter to filter a second set of taps corresponding to the sequence;
    a third filter to filter a third set of taps from at least a portion of the first set of taps and at least a portion of the second set of taps;
    a plurality of magnitude determining circuits to respectively determine magnitudes of the outputs from the first set of taps, the second set of taps and the third set of taps;
    a summation circuit to add the respective magnitudes; and
    a circuit to determine the sequence based on an output from the summation circuit.

8. The apparatus of claim 7, wherein the circuit to determine the sequence includes:
    a peak detection circuit to process an output of the summation circuit to acquire a synchronization code for the spread-spectrum signal.

9. The apparatus of claim 8, wherein the first set of taps and the second set of taps have a same number of taps.

10. The apparatus of claim 8, wherein the output from the first set of taps corresponds to a first half of the sequence and the output from the second set of taps corresponds to a second half of the sequence, wherein the output from the third set of taps determines sign difference between the outputs from the first and second set of taps when the magnitudes from the first and second set of taps are equal.

11. The apparatus of claim 10, wherein the sequence is a Hadamard sequence.

12. The apparatus of claim 10, wherein the spread-spectrum signal is a CDMA signal.

* * * * *